US008570442B2

United States Patent
Mestha et al.

(10) Patent No.: US 8,570,442 B2
(45) Date of Patent: Oct. 29, 2013

(54) HYPERSPECTRAL IMAGE RECONSTRUCTION VIA A COMPRESSED SENSING FRAMEWORK

(75) Inventors: Lalit Keshav Mestha, Fairport, NY (US); Alvaro Enrique Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 184 days.

(21) Appl. No.: 13/180,895

(22) Filed: Jul. 12, 2011

(65) Prior Publication Data
US 2013/0016284 A1    Jan. 17, 2013

(51) Int. Cl.
- *H04N 5/14*    (2006.01)
- *H04N 9/64*    (2006.01)
- *G06K 9/36*    (2006.01)
- *G06K 9/46*    (2006.01)

(52) U.S. Cl.
USPC ............................................ 348/571; 382/232

(58) Field of Classification Search
USPC ....................................................... 348/571
See application file for complete search history.

(56) References Cited

U.S. PATENT DOCUMENTS

| | | | |
|---|---|---|---|
| 7,304,801 B2 | 12/2007 | Wang et al. | |
| 7,355,714 B2 | 4/2008 | Wang et al. | |
| 7,385,704 B2 | 6/2008 | Mestha et al. | |
| 2009/0040616 A1 | 2/2009 | Lin et al. | |

OTHER PUBLICATIONS

"Compressive Sensing for Hyperspectral Imaging" Research Thesis, Yehuda Pfeffer Oct. 2010.*
"Orthogonal Bases Approach for the Decomposition of Mixed Pixels in Hyperspectral Imagery," Xuetao Tao and Bin Wang, IEEE Geoscience and Remote Sensing Letters, vol. 6 No. 2, Apr. 2009.*
"Hyperspectral projection of a coral reef scene using NIST hyperspectral image projector" David W. Allen et al., Proc. of SPIE vol. 7334 2009.*
Candes, Emmanuel J., et al., "An Introduction to compressive Sampling", IEEE Signal Processing Magazine, Mar. 2008, pp. 21-30.
Romberg, Justin, "Imaging Via Compressive Sampling", IEEE Signal Processing Magazine, Mar. 2008, pp. 14-20.
Zhang, Gesen, et al., "Compresed Sensing and Reconstruction with Bernoulli Matrices", Proceedings of the 2010 IEEE International Conference on Information and Automation, Harbin, China, Jun. 20-23, 2010, pp. 455-460.

* cited by examiner

*Primary Examiner* — Jeffeery Harold
*Assistant Examiner* — Michael Teitelbaum
(74) *Attorney, Agent, or Firm* — Philip E. Blair; Fleit Gibbons Gutman Bongini & Bianco P.L.

(57) ABSTRACT

What is disclosed is a system and method for image reconstruction using a compressed sensing framework to increase the number of wavelength bands in hyperspectral video systems. The present method utilizes a restricted representation matrix and sampling matrix to reconstruct bands to a very large number without losing information content. Reference multi-band image vectors are created and those vectors are processed in a block-wise form to obtain custom orthonormal representation matrices. A sampling matrix is also constructed offline in the factory. The compressed sensing protocol is applied using a $l_1$-norm optimization (or relaxation) algorithm to reconstruct large number of wavelength bands with each band being interspersed within the band of interest that are not imaged. The teaching hereof leads to very large number of bands without increasing the hardware cost.

25 Claims, 10 Drawing Sheets

HYPERSPECTRAL IMAGE RECONSTRUCTION VIA A COMPRESSED SENSING FRAMEWORK

TECHNICAL FIELD

The present invention is directed to systems and methods using a compressed sensing to reconstruct wavelength bands that were not imaged by a target hyperspectral video camera system to obtain a large number of wavelength bands without increasing hardware costs.

BACKGROUND

Spectral imaging is a combination of imaging and spectroscopy where a complete spectrum is collected at every location of an image plane. This technique is sometimes called hyperspectral or multispectral imaging. Spectral imaging is not restricted to visible light but works across the electromagnetic spectrum from ultraviolet to infrared. Spectroscopy captures the entire spectrum, light intensity as a function of wavelength. Its this very detailed spectral response curve that gives spectral imaging the ability to discriminate specific chemicals and elements based upon the unique reflections and absorbances of the compound.

A mini-hyperspectral imaging device can simultaneously capture the scene on to a detector array. It can be used to create hyperspectral video with optics based on simultaneous spectral decomposition. The filter units can be built with assemblies comprising 4, 8, 16, 32, 48 filters with wavelengths interspersed and fixed at the factory. Due to limitations on detector size, camera system, cost, etc., number of filters and their wavelengths are fixed at the factory. Some of the systems acquire 16 or as high as 48 simultaneous multi-spectral images of a scene in a telecentric design. When this module is mounted in a still/video camera system, scenes can be captured at each of the peak wavelengths simultaneously so that each of the frames will contain multiple bands. More bands are considered useful since they contain more information. This means, images need to be reconstructed for additional contiguous wavelengths of interest. Simple interpolation does not give good reconstruction accuracy because of limited sampling provided by the filters.

Accordingly, what is needed in this art are increasingly sophisticated systems and methods for reconstructing a large number of wavelength bands with each band being interspersed within a band of interest to obtain a large number of bands such that the full signal of an image captured using a target hyperspectral video camera system can be generated.

INCORPORATED REFERENCES

The following U.S. Patents, U.S. Patent Applications, and Publications are incorporated herein in their entirety by reference.

"Reconfigurable MEMS Fabry-Perot Tunable Matrix Filter Systems And Methods", U.S. Pat. No. 7,355,714, to Wang et al.

"Two-Dimensional Spectral Cameras And Methods For Capturing Spectral Information Using Two-Dimensional Spectral Cameras", U.S. Pat. No. 7,385,704, to Mestha et al.

"Distributed Bragg Reflector Systems And Methods", U.S. Pat. No. 7,304,801, to Wang et al.

"Fabry-Perot Piezoelectric Tunable Filter", US Patent Publication No. 20090040616 by Lin et al.

"*An Introduction to Compressive Sampling*", Emmanuel J. Candes and Michael B. Wakin, IEEE Signal Processing Magazine, (March 2008).

"*Compressed Sensing and Reconstruction with Bernoulli Matrices*", Gesen Zhang, Shuhong Jiao, Xiaoli Xu, Lan Wang, Proceedings of the 2010 IEEE International Conference on Information and Automation, Harbin, China, (Jun. 20-23, 2010).

BRIEF SUMMARY

What is disclosed is a novel system and method for image reconstruction using a compressed sensing framework to increase the number of wavelength bands in hyperspectral video systems thus effectuating reconstruction for wavelengths outside the image capture band. Representation matrices are constructed for a restricted application space over which the hyperspectral camera system would be used. The restricted representation matrix allows for the use of fewer filters while enabling higher wavelength resolutions although the restricted application space is not absolutely necessary when the total number of filters (i.e., wavelength samples) satisfies theoretical limits. The present method utilizes a sampling matrix which is preferably constructed offline in the factory. The representation matrix and the sampling matrix are used, in a manner more fully disclosed herein, to reconstruct a large number of wavelength bands without loss of image content. A large number of bands can be generated with each band being interspersed within bands that were not imaged. The present method enables random wavelength sampling thus effectively eliminating the need to have low-end and high-end filters because the first and last bands are not required, as in interpolation methods. Advantageously, the high spectral resolution of the present method provides image analysts with an enhanced capability to exploit the resulting imagery captured with low cost mini-hyperspectral systems. Moreover, since adjacent bands tend to be highly correlated, there is a level of redundancy in the spectral data that can be taken advantage of. Data can be captured in a lower dimensional space due to fewer bands while the computations can be performed in a higher dimensional space. Because the use of fewer filters helps minimize data capture costs, the teachings hereof find their uses in a variety of remote sensing applications such as, for example, crop monitoring, detection of man-made materials and chemical/oil spills, mineral exploration and mining, changes in soil composition, watershed and water management, to name a few, including enabling low cost imaging systems for healthcare applications which may be out of reach to many institutions due to the relatively high costs of Magnetic Resonance Imaging (MRI) systems.

In one example embodiment, the present for image reconstruction using a compressed sensing framework for a hyperspectral video system involves the following. First, a plurality of N×N representation matrices are received. Each representation matrix u was constructed for each of a plurality of sub-data cubes each containing a 2D array of pixels. The sub-data cubes collectively comprise a first hyperspectral image data cube constructed from a first set of different spectral planes of a hyperspectral image captured using a reference sensor where N is the total number of bands in the reference sensor. Next, a M×N sampling matrix Φ is received, where M is the number of bands in a target hyperspectral camera such that M<<N. The sampling matrix is a non-square matrix filled with 1's at locations corresponding to the peak wavelengths of filters in a multi-filter grid of a target hyperspectral camera and the remaining elements are filled with 0's. Embodiments for constructing the representation matrices are provided herein. The representation matrices and the sampling matrix are then used, in a manner more fully disclosed herein further, to reconstruct a full signal $f^*$ of a hyperspectral image captured by the target camera. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for reconstructing a large number of wavelength bands with each band being interspersed within a band of interest to obtain a large number of bands such that the full signal of an image captured using a target hyperspectral video camera system can be generated.

NON-LIMITING DEFINITIONS

A "hyperspectral camera" is a device for capturing a hyperspectral image. Hyperspectral cameras are readily available from a wide array of vendors in commerce and provide full, continuous, spectral information for each pixel in an image.

A "target hyperspectral camera" is the camera used to obtain an image to be reconstructed in accordance with the teachings hereof. The target camera has a multi-filter grid for multi-band capture of different spectral planes at wavelengths of interest with each filter being tuned to a specified wavelength in the electromagnetic spectrum.

A "hyperspectral image" is an image captured using a hyperspectral camera. Every pixel therein has an associated intensity measured in terms of a measured reflectance.

Figure 1:
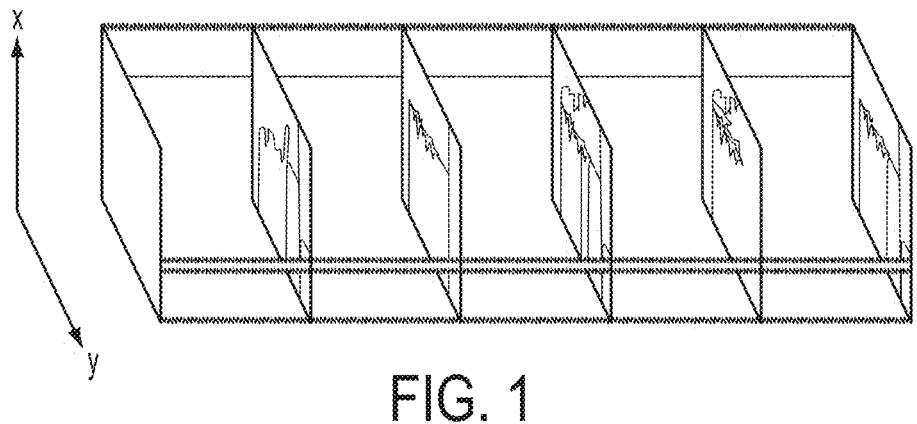
FIG. 1 illustrates an example image decomposed into a plurality of spectral planes at each of six wavelength bands.
Figure 2:
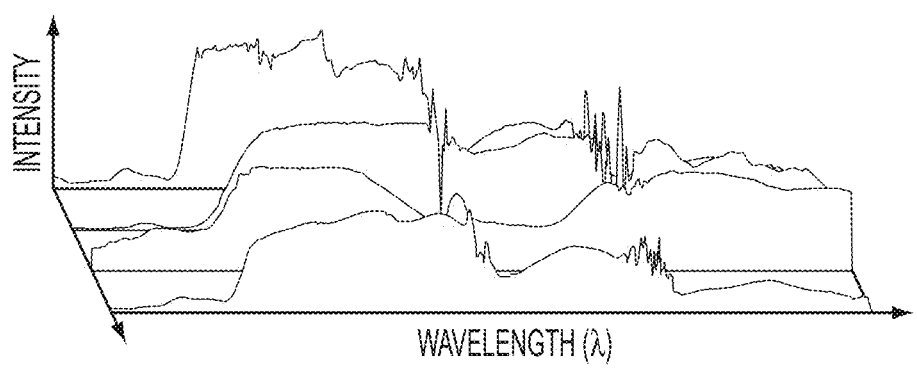
FIG. 2 shows example spectral components corresponding to the example of FIG. 1.
Figure 3:
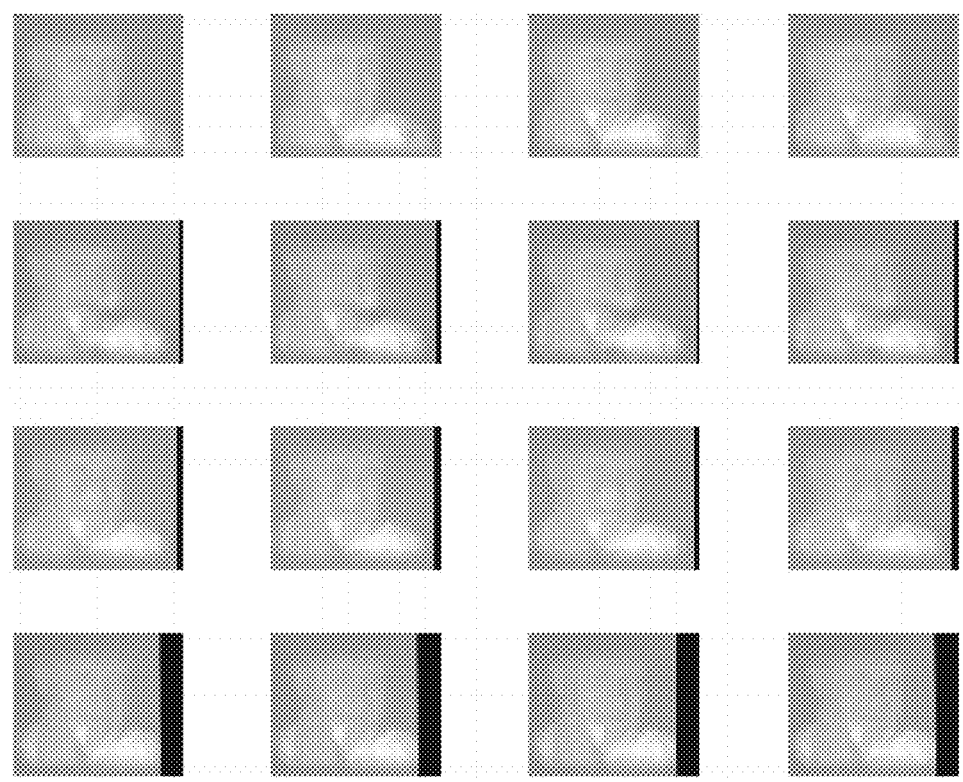
FIG. 3 shows an array of spectral images captured using a hyperspectral camera.
Figure 4:
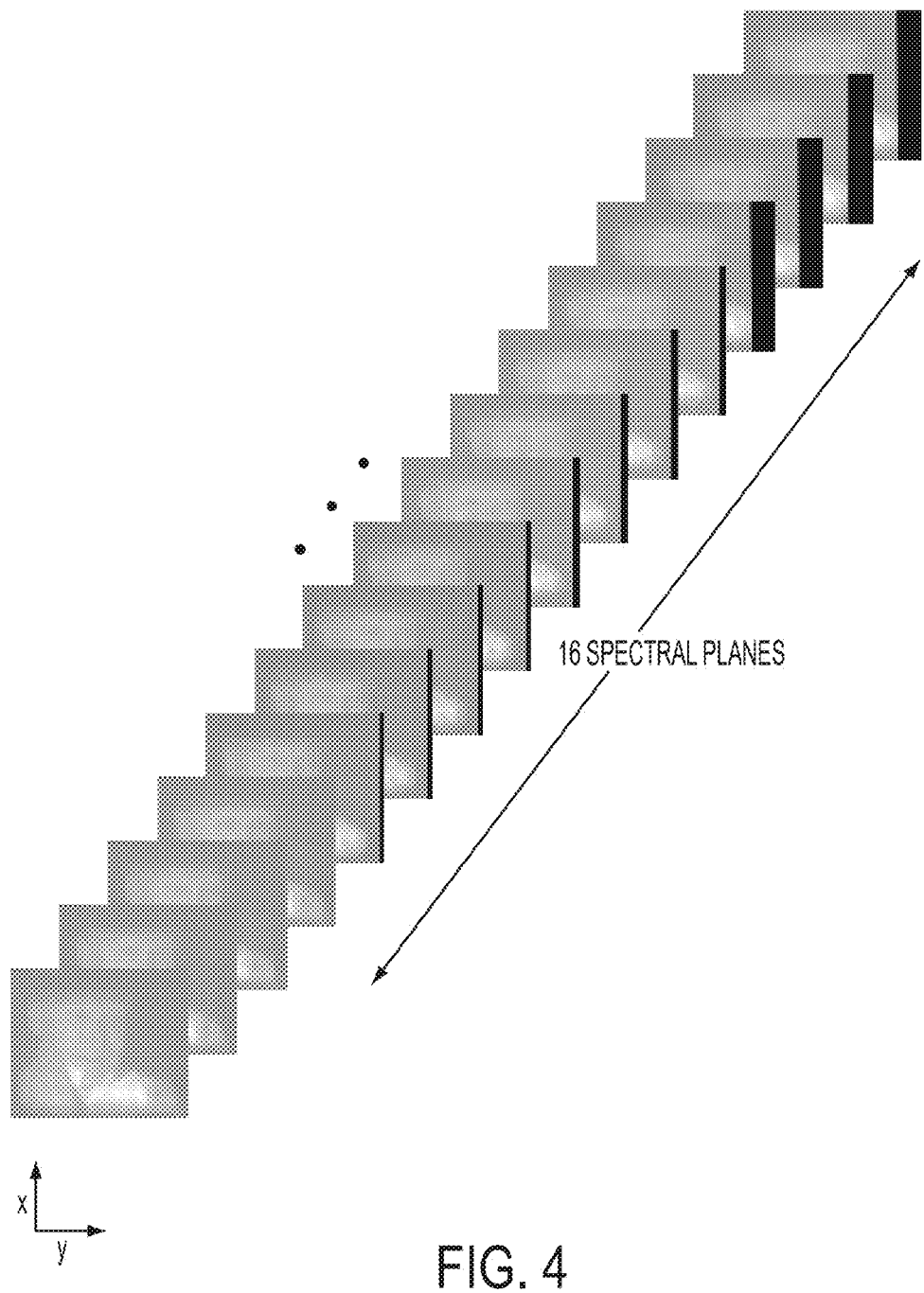
FIG. 4 shows an example hyperspectral image data cube constructed from the array of spectral images of FIG. 3.

A "hyperspectral image data cube" is a 3D matrix composed of a plurality of 2D sub-data cubes (each a 2D array of pixels) combined with a third dimension giving the spectral composition of each pixel. FIG. 1 illustrates an example hyperspectral image decomposed into a plurality of spectral planes at each of six wavelength bands. FIG. 2 illustrates example spectral components corresponding to each of the 2D arrays of FIG. 1. FIG. 3 shows a plurality of spectral images obtained from a hyperspectral camera. FIG. 4 shows an image data cube constructed from the sub-data cubes of FIG. 3.

A "multi-filter grid" is a grid of filters, e.g., Fabry-Perot filters, with each filter transmitting a desired wavelength band while rejecting wavelengths outside that band. Selection of filters enable the selection of differing peak wavelengths of interest. Fabry-Perot filters are well known in this art.

A "sampling matrix", as used herein, is a non-square matrix filled with 1's at locations corresponding to the peak wavelengths of the filters in the multi-filter grid of the target hyperspectral camera and remaining elements in the matrix equal to 0.

A "representation matrix", also called a "basis matrix" is a matrix constructed from a set of linearly independent vectors stacked side-by-side as columns. In linear algebra, a basis is a linearly independent spanning set. Given a basis of a vector space, every element of that space can be expressed uniquely as a finite linear combination of basis vectors. Every vector space has a basis. All bases of a vector space have the same number of elements, called the dimension of the vector space.

Constructing a Representation Matrix

A representation matrix for a given sub-data cube of a hyperspectral image data cube can be constructed using the following 3 primary steps:

(1) Deriving a set of natural basis vectors in a spectral direction. Natural basis vectors can be constructed from a material spectral database or from the reference hyperspectral image. Form a covariance matrix with the material spectra and determine basis vectors using singular value decomposition on the covariance matrix. Break the database of high density images into several blocks. Each block could be a square block or rectangular in size depending on the image size. The block size is dependent on the processing power available. For each block, determine basis vectors using singular value decomposition on the block-size image matrix. When the reference hyperspectral image is used, block-based natural basis vectors can be obtained, all in the spectral direction, using high density multi-band images captured. For example, if the hyperspectral video camera system is used for remote applications, a HYDICE hyperspectral aerial imagery can be used to construct the basis vector matrix. It is important to note that lower sparcity means lower sensing cost since the total number of bands can be low (approximately 4 times the sparcity).

(2) Selecting a first few of the basis vectors to restrict matrix u to a space of interest.

(3) Constructing the representation matrix $\psi$ from the selected basis vectors. In this particular step, first construct a random matrix M and replace a first few column vectors of this matrix with natural basis vectors. Use of first few natural basis vectors customizes (or restricts) the representation matrix to the space of interest. If a general representation matrix is used then sparcity will be high and the number of bands required will increase. Gram-Schmidt orthogonalization is performed on the resulting matrix to effectuate both orthogonalization and normalization of the vectors. This leads to an orthonormal matrix which is the representation matrix used for processing all the pixels within that block.

Basic Compressed Sensing Theory:

Any signal f represented as a vector N×1 can be expressed in terms of a basis comprised of N×1 vectors, where N is the total number of bands. Orthogonal basis vectors are preferred for computational reasons. If ψ is a N×N basis matrix, then the signal f can be expressed as the product of ψ and a vector x:

$$f = \psi x \quad (1)$$

where vector x is a column vector of size N×1. Both f and x are representations of the same signal. f is in the time domain when the signal is a function of time and vector x is in the basis domain ψ, (i.e., f is the pixel intensity for a given pixel represented as a function of wavelength).

If the signal is S sparse, (i.e., the signal has at most a total of S non-zero components), then the signal is compressible. Hence, the compressible signal can be approximated by a total of S basis vectors. If the basis matrix is available then vector x can be reconstructed from a small number of measurements y, (i.e., wavelength bands), of size M×1, where M<<N. As such, vector y can be written as:

$$y = \Phi f \quad (2)$$

where Φ is a M×N sampling matrix filled with a value of one where the measurements are sampled and remaining elements are set equal to zero, and x=f=filter.

Combining Eqs. (1) and (2), vector y can be written in terms of the sparse vector x as:

$$y = \Phi \psi x = Ax \quad (3)$$

where matrix A=Φψ is a non-square M×N matrix.

The sparse vector x* can be generated by performing $L_1$-norm minimization, i.e., by solving the following constrained minimization using convex optimization, such that:

$$x^* = \min \|x\|_{L1}, \text{ such that } Ax = y, \quad (4)$$

where matrix A is the product of Φ and ψ, vector x is a column vector of size N×1, and y is equal to the intensity vector for a given pixel.

Once the sparse vector x* has been recovered, the full signal f*, (i.e., vector of size N×1), can be reconstructed using the relationship of Eq. (1). That is:

$$f^* = \psi x^* \quad (5)$$

It should be appreciated that compressed sensing theory depends on the selection of the representation matrix, the sampling matrix, and the number of measurement samples.

Example Flow Diagram

Figure 5:
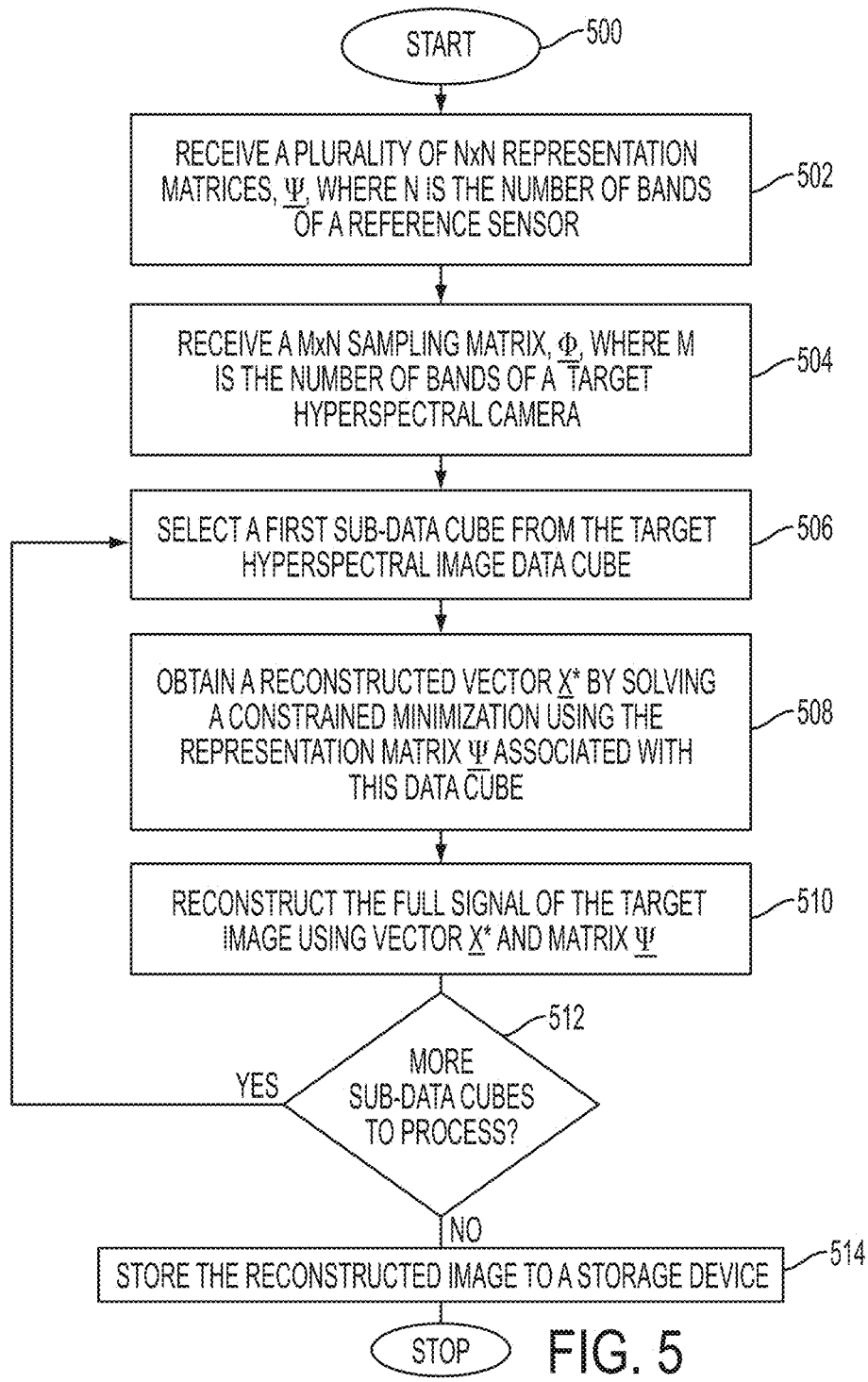
FIG. 5 is a flow diagram of one example embodiment of the present method for image reconstruction using a compressed sensing framework for a hyperspectral video system.

Reference is next being made to the flow diagram of FIG. 5 which illustrates one example embodiment of the present method for image reconstruction using a compressed sensing framework for a hyperspectral video system. The method starts at 500 and processing immediately proceeds to step 502.

At step 502, receive a plurality of N×N representation matrices where N is the total number of bands in a reference sensor. Each sub-data cube of the hyperspectral image data cube constructed from the spectral images captured using the reference sensor has an associated representation matrix ψ. Steps for generating the representation matrices are provided herein.

At step 504, receive a M×N sampling matrix Φ where M is the number of bands in a target hyperspectral camera such that M<<N. The target hyperspectral camera has captured a hyperspectral image using a minimum number of filters. The full signal of the captured image is intended to be reconstructed using the teachings hereof. It should be appreciated that the 2D spatial resolutions of the hyperspectral image data cube obtained using the spectral images captured by the sensor may or may not be the same as the 2D spatial resolutions of the hyperspectral image data cube obtained using the spectral images captured by the target camera. If the 2D spatial resolutions are not the same, the images can be resized such that the resolutions match or are made to be substantially the same. The representation matrices and the sampling matrix can be retrieved from a memory or a storage device, or obtained from a remote device over a network. In other embodiments, values for these matrices are entered using a user interface of a computer workstation such as, for example, a monitor, keyboard and mouse. One example workstation is shown and discussed with respect to the embodiment of FIG. 6.

At step 506, select a first sub-data cube for processing. These sub-data cubes are from the hyperspectral image data cube obtained from the spectral images captured using the target hyperspectral camera. Selection can be performed automatically using, for example, a computer processor and a memory which iterates over each of the 2D arrays of the hyperspectral image data cube constructed from the spectral images captured using the target hyperspectral video camera system.

At step 508, perform $L_1$-norm minimization on all pixels in this sub-data cube to obtain a reconstructed vector x*. In one embodiment, $L_1$-norm minimization comprises solving a constrained minimization as described in Eq. (4) using the representation matrix ψ associated with this sub-data cube. This is a matter of linear programming which can be effectuated using, for example, a LASSO (Least Absolute Shrinkage and Selection Operator) algorithm, or a Basis Pursuit algorithm. The reconstructed vector x* can be stored to a storage device or a memory.

At step 510, the full signal f* of the target hyperspectral image is reconstructed using vector x* and the corresponding representation matrix ψ. This relationship is show in Eq. (5). This can be performed using a computer processor and a memory.

At step 512, a determination is made whether any more sub-data cubes remain to be processed. If so, then processing continues with respect to step 506 wherein a next sub-data cube is selected or otherwise identified for processing. $L_1$-norm minimization is again performed on all pixels in this sub-data cube to reconstruct vector x* using the representation matrix ψ associated with this next sub-data cube. The full signal of this portion of the image is reconstructed using vector x*. Processing continues until all pixels of all sub-data cubes in the target hyperspectral image have been processed accordingly and the full signal of the entire image has been reconstructed.

At step 514, the reconstructed image is stored to a memory or storage device. In other embodiments, the reconstructed image is communicated to a remote device over a network. Thereafter, in this example flow diagram, further processing stops.

It should be understood that the flow diagrams depicted herein are illustrative. One or more of the operations illustrated in any of the flow diagrams may be performed in a differing order. Other operations may be added, modified, enhanced, condensed, integrated, or consolidated. Variations thereof are intended to fall within the scope of the appended claims. All or portions of the flow diagrams may be implemented partially or fully in hardware in conjunction with machine executable instructions in communication with various components of such a system.

Example Networked Image Reconstruction System

Figure 6:
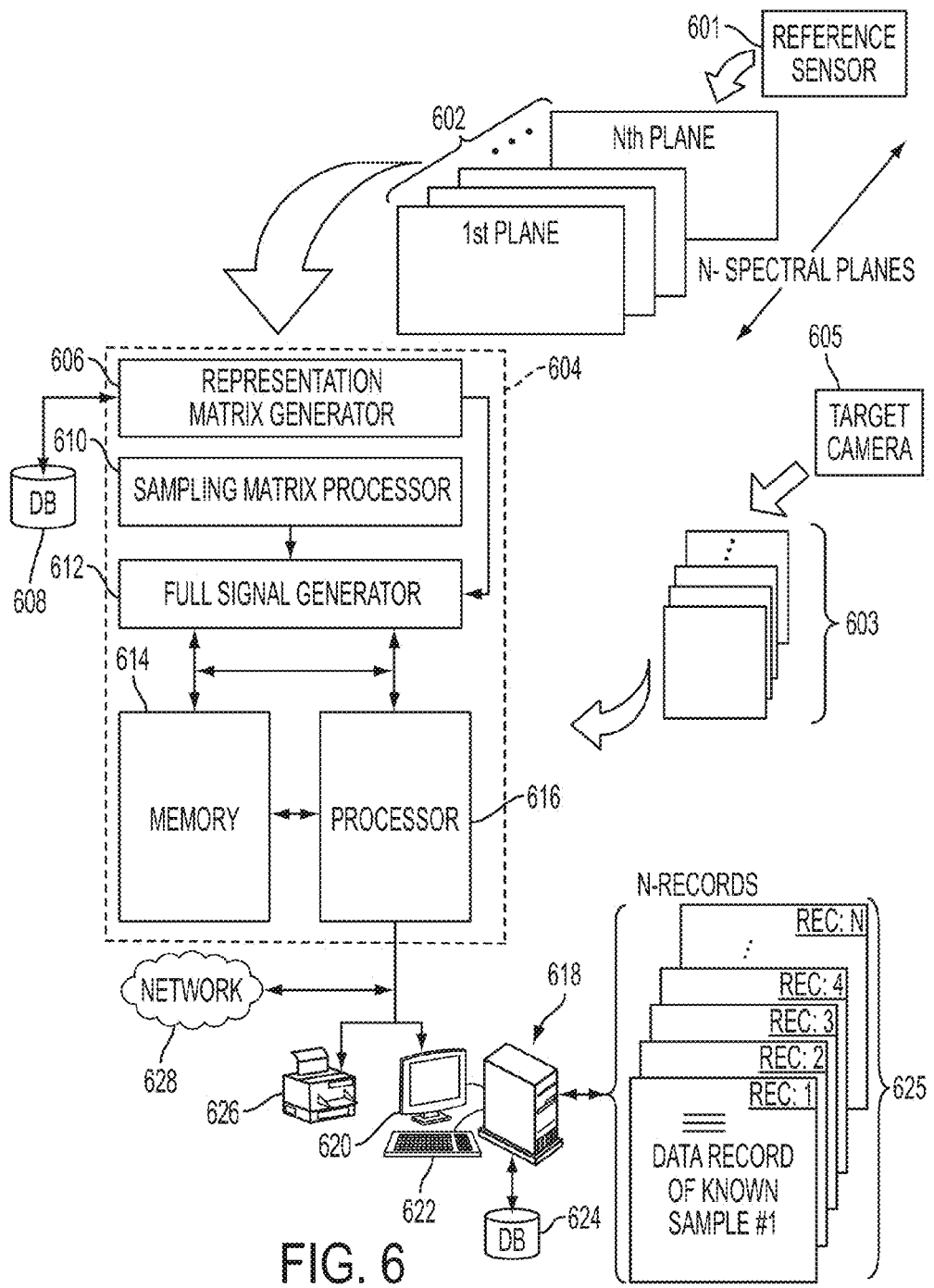
FIG. 6 illustrates one example embodiment of a function block diagram having a networked computer workstation, database, plurality of data records, and an image processing system for performing various aspects of the present method as described with respect to the flow diagram of FIG. 5.

Reference is now being made to FIG. 6 which illustrates one example embodiment of a function block diagram for performing various aspects of the present method as described with respect to the flow diagram of FIG. 5.

In FIG. 6, an example hyperspectral image data cube 602 which has been captured using a reference sensor 601, is provided to image processing system 604 shown comprising a plurality of modules. Representation Matrix Generator 606 creates a plurality of N×N representation matrices where N is the total number of bands in reference sensor 601. A representation matrix $\psi$ is constructed for each sub-data cube of hyperspectral image data cube 602. The representation matrices are stored to storage device 608. The representation matrices may be retrieved from device 608. Sampling Matrix Processor 610 receives a hyperspectral image data cube 603 generated from spectral images obtained using a target hyperspectral video system 605 and generates a M×N sampling matrix $\Phi$ where M is the number of bands in target camera 605 such that M<<N. The sampling matrix may be stored and/or retrieved to/from storage device 608. The representation matrices and the sampling matrix may also be retrieved from memory 614 and/or storage device 624 and/or a remote device over network 628. In other embodiments, a user enters one or more values for these matrices using the user interface of computer workstation 616. The representation matrices, the sampling matrices, and the sub-data cubes of the target image data cube 603 are provided to Full Signal Generator 612 which reconstructs the full signal f* of the target hyperspectral image. Processor 616 and memory 614 are provided to facilitate the functions performed by any of the modules while providing memory and processing throughput between the various modules and workstation 618. Processor 616 is capable of executing machine readable program instructions for performing various aspects of any of the functionality of any of the modules of system 604. The user interface of workstation 618 facilitates a user interaction with various modules of system 604. In various embodiments, the user enters data or makes a selection via monitor 620 and keyboard 622 to identify sub-data cubes for processing. Information required by any of the modules of system 604 may be provided by a user using workstation 618. Printer 626 enables the user to obtain a hardcopy of any desired information. Printed information may take the form of, for example, various pixels within sub-data cubes of the image or within areas of the image desired to be processed or resized. Information may be communicated to the workstation by any of the modules of system 604 via processor 616 or via communications pathways not shown. Workstation 618 and any of the modules of system 604 may communicate with one or more remote devices over network 628. Results of any of the operations performed by any of the modules of system 604 in accordance with the teachings hereof can be communicated to one or more devices or systems over network 628 for additional processing and/or storage. Some or all of the reconstructed image may be communicated to storage device 624, communicated to a remote device over network 628, or stored as records 625. The N-records in material spectral database 625 are illustrative. In one embodiment, the hyperspectral image data cube 602 from reference sensor 601 and/or the image data cube 603 from target camera system 605 are provided, in whole or in part, to system 604 by workstation 618.

Performance Results

A low resolution InGaAs VISNIR camera (256×320 pixels) from Xenics Inc. having a range of 400 nm to 1700 nm was used. We conducted a static scene capture experiments with 41 narrow band filters. A total of 41 images were then interpolated with an interpolation algorithm to synthesize 126 bands between 400 nm to 1650 nm. This kind of up-sampling was necessary since the present compressed sensing framework would require a reasonably large vector size. We used the teachings hereof for reconstructing a 126 band data cube. A total of 80 blocks were used with each block having a 2D array size of 31×31 pixels. Restricted representation matrices were obtained for each block with 15 basis vectors. Images were filtered with 10 basis vectors to create sparcity. On yet another data set, a 210 band data cube was obtained from spectral images captured using a 48 band hyperspectral camera system was reconstructed. Singular Value Decomposition (SVD) based spectral filtering method was used on the original 210 band imagery. Sparcity was 10. Hence, measurement samples greater than 4 times sparcity gave good reconstruction results. Coherence was 4.52 and tests with Restricted Isometric Property produced a delta value of 1 resulting in high probability of success.

Figure 7:
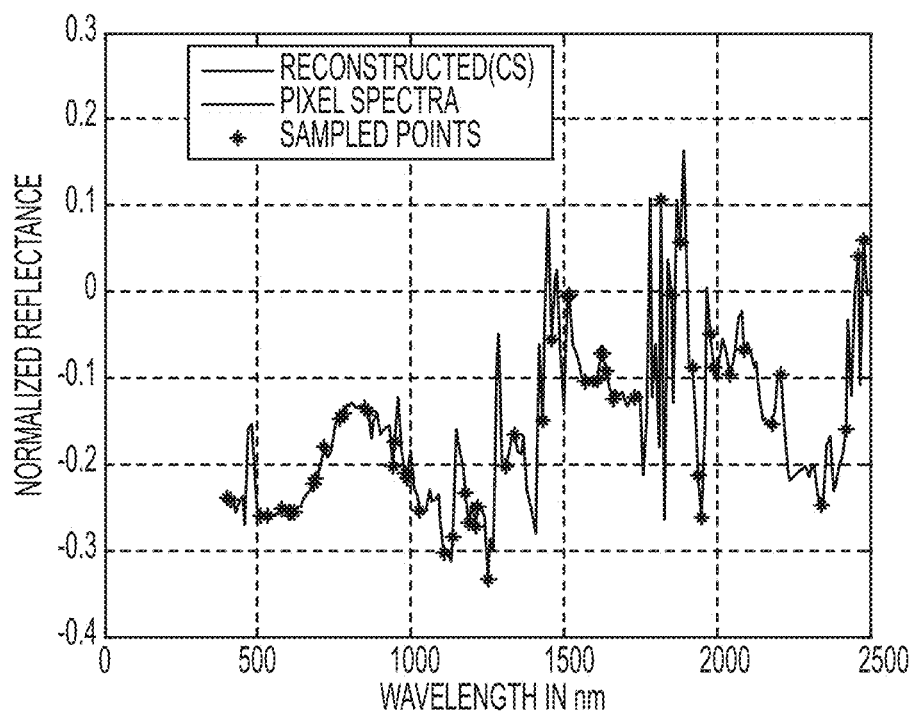
FIG. 7 shows spectra of an example filtered pixel spectra and reconstructed spectra with 48 bands using the teachings hereof.
Figure 8:
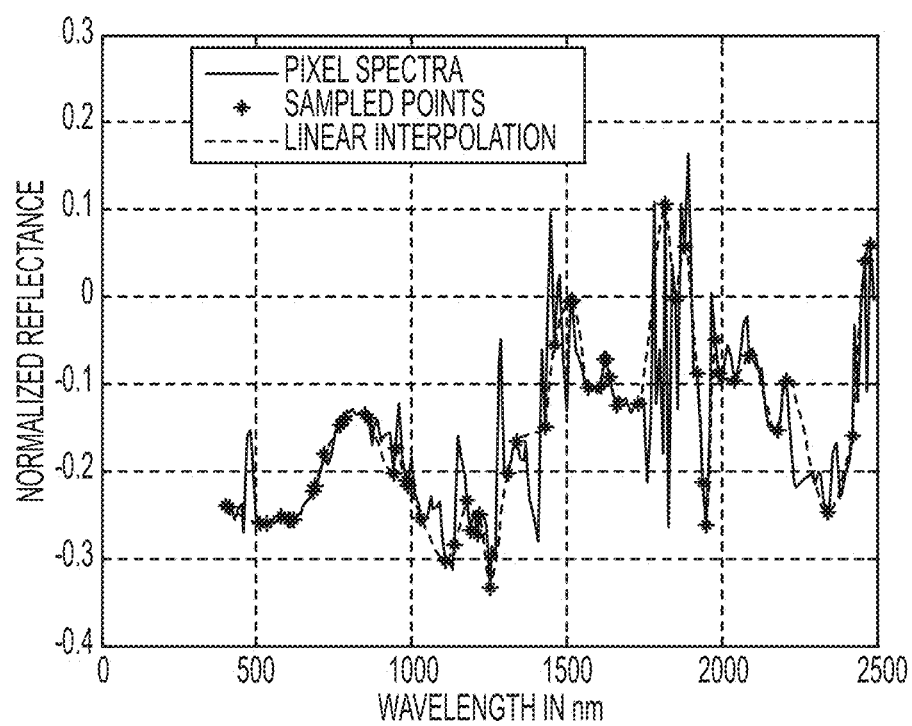
FIG. 8 shows spectra of an example filtered pixel spectra and reconstructed spectra with 50 bands using linear interpolation.

FIGS. 7 and 8 show spectra for an example pixel using two types of reconstruction protocols. In FIG. 7, the results of the compressed sensing protocol were compared with the original 210 band signal. Here the signal was reconstructed with a minimum of 48 bands. The points "+" represent where the measurement samples were available. In FIG. 8, the results of the linear interpolation algorithm were compared with spectra when constructed with 50 band capture. It includes two outlier bands (one at 400 nm and one at 2490 nm) which are required for reconstruction using linear interpolation.

Figure 9:
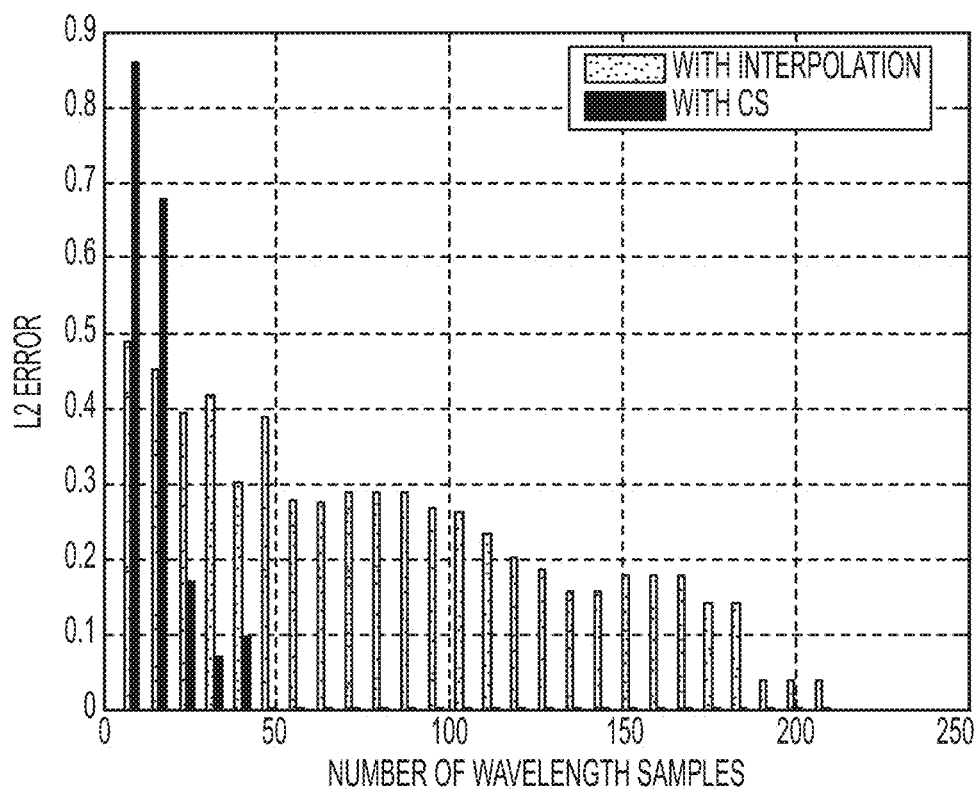
FIG. 9 plots the L2 error with respect to wavelength samples between bands reconstructed using the present method and with linear interpolation.
Figure 10:
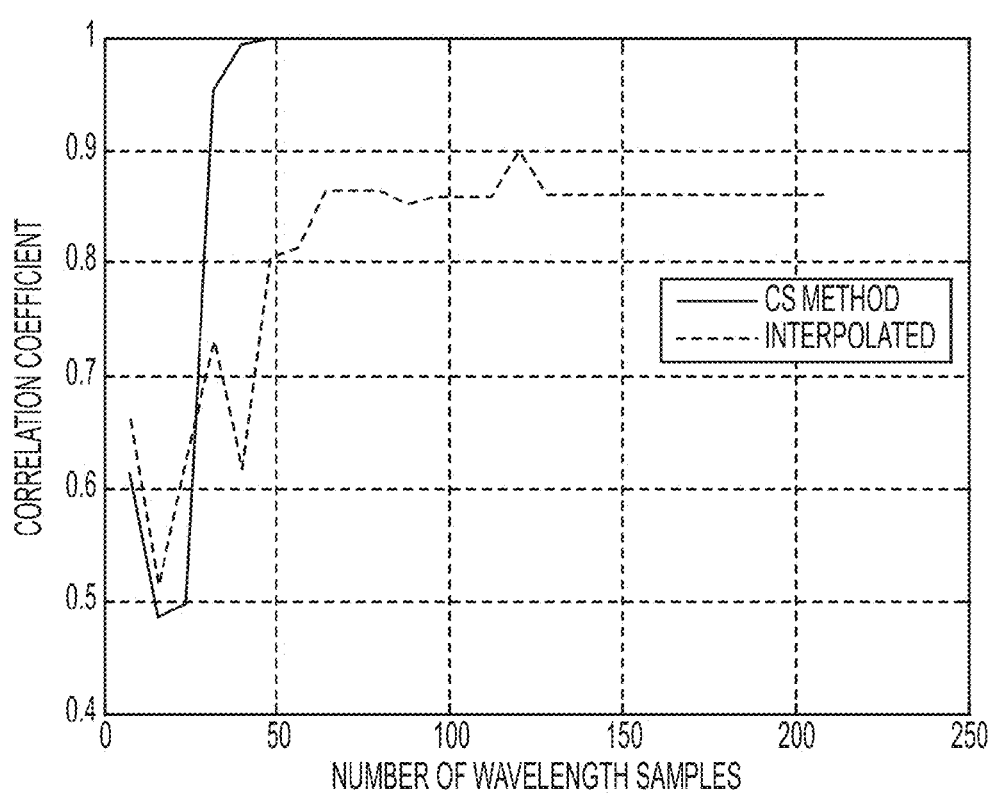
FIG. 10 shows the correlation between filtered pixel spectra and reconstructed spectra with respect to wavelength samples.
Figure 11:
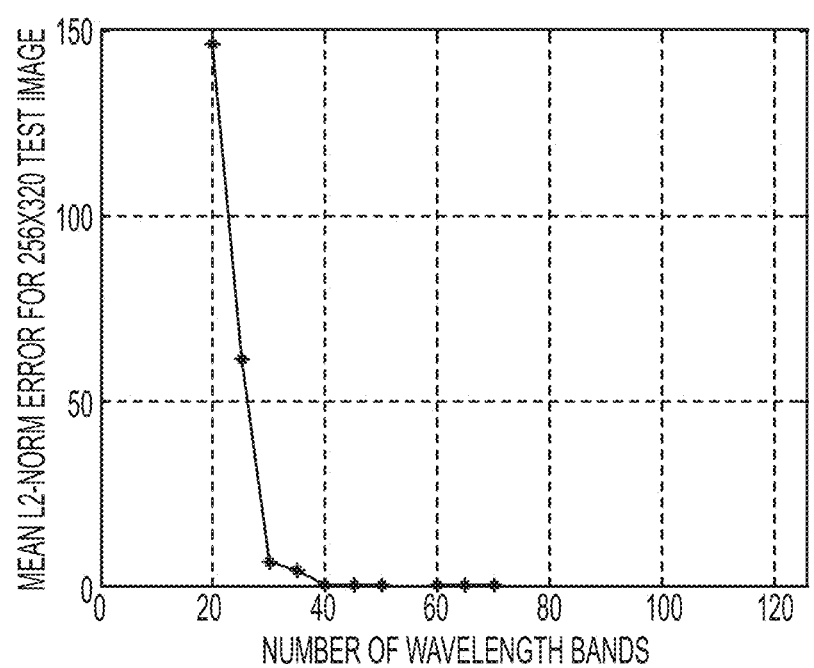
FIG. 11 shows the mean error with respect to wavelength samples between reconstructed and filtered original spectra.

FIG. 9 shows the squared error (i.e., $L_2$-norm) between the filtered original vector and the reconstructed vector for the present method and linear interpolation. FIG. 10 shows the correlation coefficient between the filtered original vector and the reconstructed vector for both methods. Clearly, reconstruction using the present method resulted in nearly zero error. L2-norm error, a mean value for all the pixels (i.e., entire image), was near zero when the compressed sensing protocol was used with nearly 60 bands. Note that various parameters (block size, number of basis vectors etc) need further optimization to minimize the total number of bands. FIG. 11 shows the mean L2 error with respect to wavelength samples (i.e., number of bands) between reconstructed spectra of a 256×320 pixel test scene and filtered original (with CS reconstruction). FIGS. 9 and 10 show results only for one filtered sample pixel with one restricted representation matrix and one sample matrix, whereas FIG. 11 is extended for all the pixels in the image using 80 blocks, i.e., we had 80 restricted representation matrices and one sampling matrix.

Various Embodiments

It should be appreciated that various modules may designate one or more components which may, in turn, comprise software and/or hardware designed to perform the intended function. A plurality of modules may collectively perform a single function. Each module may comprise a single piece of hardware such as an ASIC. A plurality of modules may be executed by either a single system or a plurality of systems functioning in parallel. Connections between modules include both physical and logical connections. Modules may further include one or more software modules which may further comprise an operating system, drivers, device controllers, and other apparatuses some or all of which may be connected via a network. It is also contemplated that one or more aspects of the present method may be implemented in distributed computing environments where tasks are performed by remote devices that are linked through a network. Features or functionality of any of the above-described modules may comprise, in whole or in part, a special purpose computer which includes a special purpose processor capable of executing machine readable program instructions for carrying out one or more aspects of the present method. Such a special purpose computer may comprise, for example, a micro-processor, micro-controller, device driver, an electronic circuit, or an ASIC designed to perform some or all of the methods hereof. Such a special purpose computer can be integrated, in whole or in part, with for example, a color management system, an image processing system, a digital front end (DFE), and the like. All or portions of the diagrams of the present system and method, as illustrated herein, may be implemented partially or fully in hardware in conjunction with machine executable instructions in communication with various components of such a system.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of a system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for image reconstruction using a compressed sensing framework for a hyperspectral video system, the method comprising:

constructing, for each of a plurality of sub-data cubes, a N×N representation matrix $\psi$, each of said sub-data cubes containing a 2D array of pixels and collectively comprising a first hyperspectral image data cube constructed from a first set of different spectral planes of a hyperspectral image captured using a reference sensor, where N is a total number of bands in said reference sensor, wherein constructing each representation matrix comprises:

creating a matrix of random numbers;

deriving a set of natural basis vectors in a spectral direction;

selecting a first few of said natural basis vectors to restrict said representation matrix to a space of interest;

replacing a first few columns of said random number matrix with said selected first few natural basis vectors; and performing Gram-Schmidt ortho-normalization to obtain said representation matrix;

receiving a M×N sampling matrix $\Phi$ comprising a non-square matrix filled with 1's at locations corresponding to the peak wavelengths of filters in a multi-filter grid of a target hyperspectral camera and with remaining elements filled with 0's, where M a number of bands in said target camera such that M<<N; and using said constructed representation matrices and said sampling matrix to reconstruct a full signal $f^*$ of a hyperspectral image captured by said target hyperspectral camera.

2. The method of claim 1, further comprising:

capturing a second set of different spectral planes using said target hyperspectral camera;

constructing a second hyperspectral image data cube from said second set of spectral planes; and partitioning said second hyperspectral image data cube into a plurality of sub-data cubes each containing a 2D array of pixels.

3. The method of claim 2, wherein reconstructing said full signal $f^*$ of said hyperspectral image comprises:

for all sub-data cubes:

for all pixels in the current sub-data cube:

performing $L_1$-norm minimization to obtain a vector $x^*$ using the representation matrix $\psi$ corresponding to this sub-data cube; and using said vector $x^*$ and said corresponding representation matrix $\psi$ to reconstruct said full signal $f^*$, such that: $f^* = \psi x^*$.

4. The method of claim 3, wherein $L_1$-norm minimization comprises solving, for every pixel in each spectral plane, a constrained minimization given by:

$$x^* = \min \|x\|_{L_1}, \text{ such that } Ax = y,$$

where matrix A is a product of $\Phi$ and $\psi$, x is a column vector of size N×1, and y is equal to the intensity vector for a given pixel in a sub-data cube from said target hyperspectral image.

5. The method of claim 4, wherein said constrained minimization is solved using any of: a LASSO (least absolute shrinkage and selection operator) algorithm, and a Basis Pursuit algorithm.

6. The method of claim 2, further comprising, for each sub-data cube obtained from having partitioned said second hyperspectral image data cube, filtering said second set of spectral planes in a spectral direction of at least one filter of said target camera's hyperspectral image data cube.

7. The method of claim 2, further comprising using a Gram-Schmidt Orthogonalization to restrict matrix ψ to said space of interest.

8. The method of claim 1, wherein said target hyperspectral camera has a multi-filter grid for multi-band capture of different spectral planes at wavelengths of interest with each filter being tuned to a specified wavelength of interest in the electromagnetic spectrum.

9. The method of claim 2, wherein the 2D spatial resolutions of said first hyperspectral image data cube is the same as the 2D spatial resolution of said second hyperspectral image data cube.

10. The method of claim 2, wherein, in response to the 2D spatial resolutions of said first hyperspectral image data cube not being the same as the 2D spatial resolutions of said second hyperspectral image data cube, resizing said image to match said resolutions.

11. A hyperspectral video system for image reconstruction using a compressed sensing framework, the system comprising:
   a reference sensor having a total of N bands;
   a target hyperspectral camera having a multi-filter grid of a total of M bands where M<<N;
   a memory and a storage medium; and
   a processor in communication with said storage medium and said memory, said processor executing machine readable instructions for performing:
      constructing, for each of a plurality of sub-data cubes, a N×N representation matrix ψ, each of said sub-data cubes containing a 2D array of pixels and collectively comprising a first hyperspectral image data cube constructed from a first set of different spectral planes of a hyperspectral image captured using said reference sensor, wherein constructing each representation matrix comprises:
      creating a matrix of random numbers;
      deriving a set of natural basis vectors in a spectral direction;
      selecting a first few of said natural basis vectors to restrict said representation matrix to a space of interest;
      replacing a first few columns of said random number matrix with said selected first few natural basis vectors; and
      performing Gram-Schmidt ortho-normalization to obtain said representation matrix;
   retrieving, from said memory, a M×N sampling matrix φ comprising a non-square matrix filled with 1's at locations corresponding to the peak wavelengths of filters in said multi-filter grid and with remaining elements filled with 0's;
   using said constructed representation matrices and said sampling matrix to reconstruct a full signal $f^*$ of a hyperspectral image captured by said target hyperspectral camera; and
   storing said reconstructed hyperspectral image to said storage medium.

12. The system of claim 11, further comprising:
   capturing a second set of different spectral planes using said target hyperspectral camera;
   constructing a second hyperspectral image data cube from said second set of spectral planes; and
   partitioning said second hyperspectral image data cube into a plurality of sub-data cubes each containing a 2D array of pixels.

13. The system of claim 12, wherein reconstructing said full signal $f^*$ of said hyperspectral image comprises:
   for all sub-data cubes:
      for all pixels in the current sub-data cube:
         performing $L_1$-norm minimization to obtain a vector $x^*$ using the representation matrix ψ corresponding to this sub-data cube; and
         using said vector $x^*$ and said corresponding representation matrix ψ to reconstruct said full signal $f^*$, such that: $f^* = \psi x^*$.

14. The system of claim 13, wherein $L_1$-norm minimization comprises solving, for every pixel in each spectral plane, a constrained minimization given by:

$$x^* = \min\|x\|_{L1}, \text{ such that } Ax = y,$$

where matrix A is a product of φ and ψ, x is a column vector of size N×1, and y is equal to the intensity vector for a given pixel in a sub-data cube from said target hyperspectral image.

15. The system of claim 14, wherein said constrained minimization is solved using any of: a LASSO (least absolute shrinkage and selection operator) algorithm, and a Basis Pursuit algorithm.

16. The system of claim 12, further comprising, for each sub-data cube obtained from having partitioned said second hyperspectral image data cube, filtering said second set of spectral planes in a spectral direction of at least one filter of said target camera's hyperspectral image data cube.

17. The system of claim 12, further comprising using a Gram-Schmidt Orthogonalization to restrict matrix ψ to said space of interest.

18. The system of claim 11, wherein said target hyperspectral camera has a multi-filter grid for multi-band capture of different spectral planes at wavelengths of interest with each filter being tuned to a specified wavelength of interest in the electromagnetic spectrum.

19. The system of claim 12, wherein the 2D spatial resolutions of said first hyperspectral image data cube is the same as the 2D spatial resolution of said second hyperspectral image data cube.

20. The system of claim 12, wherein, in response to the 2D spatial resolutions of said first hyperspectral image data cube not being the same as the 2D spatial resolutions of said second hyperspectral image data cube, resizing said image to match said resolutions.

21. A computer implemented method for image reconstruction using a compressed sensing framework for a hyperspectral video system, the method comprising:
   constructing, for each of a plurality of sub-data cubes a N×N representation matrix ψ, each of said sub-data cubes containing a 2D array of pixels and collectively comprising a first hyperspectral image data cube constructed from a first set of different spectral planes of a hyperspectral image captured using a reference sensor, where N is a total number of bands in said reference sensor, wherein constructing each representation matrix comprises:
      creating a matrix of random numbers;
      deriving a set of natural basis vectors in a spectral direction;

selecting a first few of said natural basis vectors to restrict said representation matrix to a space of interest;

replacing a first few columns of said random number matrix with said selected first few natural basis vectors; and performing Gram-Schmidt ortho-normalization to obtain said representation matrix;

receiving a M×N sampling matrix φ comprising a non-square matrix filled with 1's at locations corresponding to the peak wavelengths of filters in a multi-filter grid of a target hyperspectral camera and with remaining elements filled with 0's, where M is a number of bands in said target camera such that M<<N; and using said constructed representation matrices and said sampling matrix to reconstruct a full signal $f^*$ of a hyperspectral image captured by said target hyperspectral camera.

22. The computer implemented method of claim 21, further comprising:

capturing a second set of different spectral planes using said target hyperspectral camera;

constructing a second hyperspectral image data cube from said second set of spectral planes; and partitioning said second hyperspectral image data cube into a plurality of sub-data cubes each containing a 2D array of pixels.

23. The computer implemented method of claim 21, wherein reconstructing said full signal $f^*$ of said hyperspectral image comprises:

for all sub-data cubes:

for all pixels in the current sub-data cube:

performing $L_1$-norm minimization to obtain a vector x using the representation matrix ψ corresponding to this sub-data cube, wherein $L_1$-norm minimization comprises solving, for every pixel in each spectral plane, a constrained minimization given by: $x^* = \min\|x\|_{L_1}$, such that Ax=y, where A is a product of φ and ψ, x is a column vector of size N×1, and y is equal to the intensity vector for a given pixel in a sub-data cube from target hyperspectral image; and using said vector $x^*$ and said corresponding representation matrix ψ to reconstruct said full signal $f^*$, such that: $f^* = \psi x^*$.

24. The method of claim 1, wherein said reference sensor and said target hyperspectral camera have different 2D spatial resolutions.

25. The system of claim 11, wherein said reference sensor and said target hyperspectral camera have different 2D spatial resolutions.

* * * * *